(12) United States Patent
Van Buchan et al.

(10) Patent No.: US 9,404,559 B2
(45) Date of Patent: Aug. 2, 2016

(54) FIXTURE, MAINTENANCE ASSEMBLY, AND METHOD FOR MAINTAINING WIND TURBINE GEARBOX

(75) Inventors: Charles Van Buchan, Greer, SC (US); Gregory Thomas, Langhorne, PA (US); Forrest Christopher Hach, Lake Benton, MN (US); Richard Arland Ohl, Jr., Hudson, NY (US); Cody Gregory, Abilene, TX (US)

(73) Assignee: General Electric Company, Schenectady, NY (US)

( * ) Notice: Subject to any disclaimer, the term of this patent is extended or adjusted under 35 U.S.C. 154(b) by 997 days.

(21) Appl. No.: 13/607,878

(22) Filed: Sep. 10, 2012

(65) Prior Publication Data

US 2014/0073477 A1    Mar. 13, 2014

(51) Int. Cl.

| B66C 1/00 | (2006.01) |
|---|---|
| F16H 19/00 | (2006.01) |
| F16H 1/28 | (2006.01) |
| B23P 17/00 | (2006.01) |
| B66C 1/24 | (2006.01) |
| F03D 11/02 | (2006.01) |
| F16H 57/023 | (2012.01) |
| F03D 1/00 | (2006.01) |
| F16H 57/00 | (2012.01) |
| F16H 57/02 | (2012.01) |

(52) U.S. Cl.
CPC . *F16H 1/28* (2013.01); *B23P 17/00* (2013.01); *B66C 1/24* (2013.01); *F03D 1/003* (2013.01); *F03D 11/02* (2013.01); *F16H 57/023* (2013.01); *F05B 2260/40311* (2013.01); *F16H 2057/0062* (2013.01); *F16H 2057/02078* (2013.01); *Y02E 10/722* (2013.01); *Y10T 29/49718* (2015.01)

(58) Field of Classification Search
CPC ............... B66C 1/24; B66C 1/34; B66C 1/54
USPC ................. 74/318, 413; 294/67.21, 67.22
See application file for complete search history.

(56) References Cited

U.S. PATENT DOCUMENTS

| 2,752,191 | A | * | 6/1956 | Pierce | ........ B66C 1/24 29/252 |
|---|---|---|---|---|---|
| 2,816,792 | A | * | 12/1957 | Dixon | ........ B66C 1/24 294/103.2 |
| 2,984,513 | A | * | 5/1961 | Nearman | ........ B66C 1/62 279/108 |
| 3,039,810 | A | * | 6/1962 | Bellingher | ........ B66C 1/24 294/67.22 |
| 5,332,351 | A | * | 7/1994 | Nelson | ........ B21C 47/24 414/684 |

(Continued)

FOREIGN PATENT DOCUMENTS

WO    WO 2012/062352    5/2012

*Primary Examiner* — Ha D Ho
(74) *Attorney, Agent, or Firm* — Dority & Manning, P.A.

(57) ABSTRACT

Fixtures, maintenance assemblies, and methods for maintaining a wind turbine gearbox are provided. The gearbox includes a sun pinion and a bull gear surrounding the sun pinion. The sun pinion and the bull gear each define a central aperture therethrough and have a central axis. The gearbox further includes a casing, at least a portion of the casing coupled to the bull gear. The fixture includes a frame member and a shaft extending from the frame member. The shaft is insertable through the central aperture of the sun pinion. The fixture further includes an attachment mechanism removably attachable to the sun pinion. Upon attachment of the attachment mechanism to the sun pinion, the fixture is configured for moving the sun pinion along the central axis of the sun pinion.

15 Claims, 11 Drawing Sheets

(56) References Cited

U.S. PATENT DOCUMENTS

| | | | | |
|---|---|---|---|---|
| 6,116,669 A | * | 9/2000 | Scaglia | B65H 67/0411 242/559.1 |
| 6,578,892 B2 | * | 6/2003 | Tsimmerman | B66C 1/107 294/67.21 |
| 7,717,673 B2 | * | 5/2010 | Menke | F03D 7/0224 416/1 |
| 8,257,019 B2 | * | 9/2012 | Cironi | F03D 1/04 415/126 |
| 8,267,447 B2 | * | 9/2012 | Shaw | B62D 43/002 294/67.2 |
| 8,308,413 B2 | * | 11/2012 | Ford | A01G 1/004 242/403 |
| 9,028,215 B2 | * | 5/2015 | Smook | F03D 1/001 416/170 R |

\* cited by examiner

US 9,404,559 B2

FIXTURE, MAINTENANCE ASSEMBLY, AND METHOD FOR MAINTAINING WIND TURBINE GEARBOX

FIELD OF THE INVENTION

The present disclosure relates in general to wind turbine gearboxes, and in particular to methods and apparatus for maintaining wind turbine gearboxes and components thereof.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In wind turbines that utilized gearboxes, the performance of the gearbox is critical to the successful operation of the wind turbine. As such, maintenance of the gearbox is critical. However, due to the size and location of the gearbox in the wind turbine, accessing the gearbox and various components thereof for maintenance purposes is difficult, time-consuming, and dangerous. For example, to maintain the gearbox, the gears and other components of the gearbox must typically be removed from the gearbox casing. These components can then be checked for damage, and can be repaired or replaced if necessary. The components must them be replaced in the gearbox casing.

Currently known methods and apparatus for performing such maintenance, and in particular for removing and/or replacing the components of the gearbox, are crude and in many cases can be dangerous both to the components and to the workers performing gearbox maintenance. For example, chains and lifting straps are typically tied to the gears of the gearbox, and the chains are then pulled to remove the gears. These removal methods, however, are unreliable and dangerous. In particular, current methods and apparatus have no way to take into account the angle at which the gearbox is disposed, which in some cases ranges from approximately 4 degrees to approximately 6 degrees. Rather, current removal methods, for example, remove the gears along a path that is not generally parallel to these angles, which can damage the gears being removed.

Accordingly, improved methods and apparatus for maintaining wind turbine gearboxes are desired. In particular, methods and apparatus for removing and replacing gears from the gearbox that are safe and efficient, and that account for the orientation of the gearboxes, would be advantageous.

BRIEF DESCRIPTION OF THE INVENTION

Aspects and advantages of the invention will be set forth in part in the following description, or may be obvious from the description, or may be learned through practice of the invention.

In one embodiment, a fixture for maintaining a wind turbine gearbox is disclosed. The gearbox includes a sun pinion and a bull gear surrounding the sun pinion. The sun pinion and the bull gear each define a central aperture therethrough and have a central axis. The gearbox further includes a casing, at least a portion of the casing coupled to the bull gear. The fixture includes a frame member and a shaft extending from the frame member. The shaft is insertable through the central aperture of the sun pinion. The fixture further includes an attachment mechanism removably attachable to the sun pinion. Upon attachment of the attachment mechanism to the sun pinion, the fixture is configured for moving the sun pinion along the central axis of the sun pinion.

In another embodiment, a maintenance assembly for a wind turbine gearbox is disclosed. The gearbox includes a sun pinion and a bull gear surrounding the sun pinion. The sun pinion and the bull gear each define a central aperture therethrough and have a central axis. The gearbox further includes a casing, at least a portion of the casing coupled to the bull gear. The maintenance assembly includes a fixture. The fixture includes a frame member and a shaft extending from the frame member. The shaft is insertable through the central aperture of the sun pinion. The fixture further includes an attachment mechanism removably attachable to the sun pinion. The fixture further includes a hoist ring. The crane is configured to move the fixture, the fixture being connected to the crane at the hoist ring. Upon attachment of the attachment mechanism to the sun pinion, the fixture and sun pinion are configured for movement by the crane along the central axis of the sun pinion.

In another embodiment, a method for maintaining a wind turbine gearbox is disclosed. The gearbox includes a sun pinion and a bull gear surrounding the sun pinion. The sun pinion and the bull gear each define a central aperture therethrough and have a central axis. The gearbox further includes a casing, at least a portion of the casing coupled to the bull gear. The method includes inserting a shaft through the central aperture of the sun pinion, attaching the sun pinion to a frame member, and moving the sun pinion along the central axis of the sun pinion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
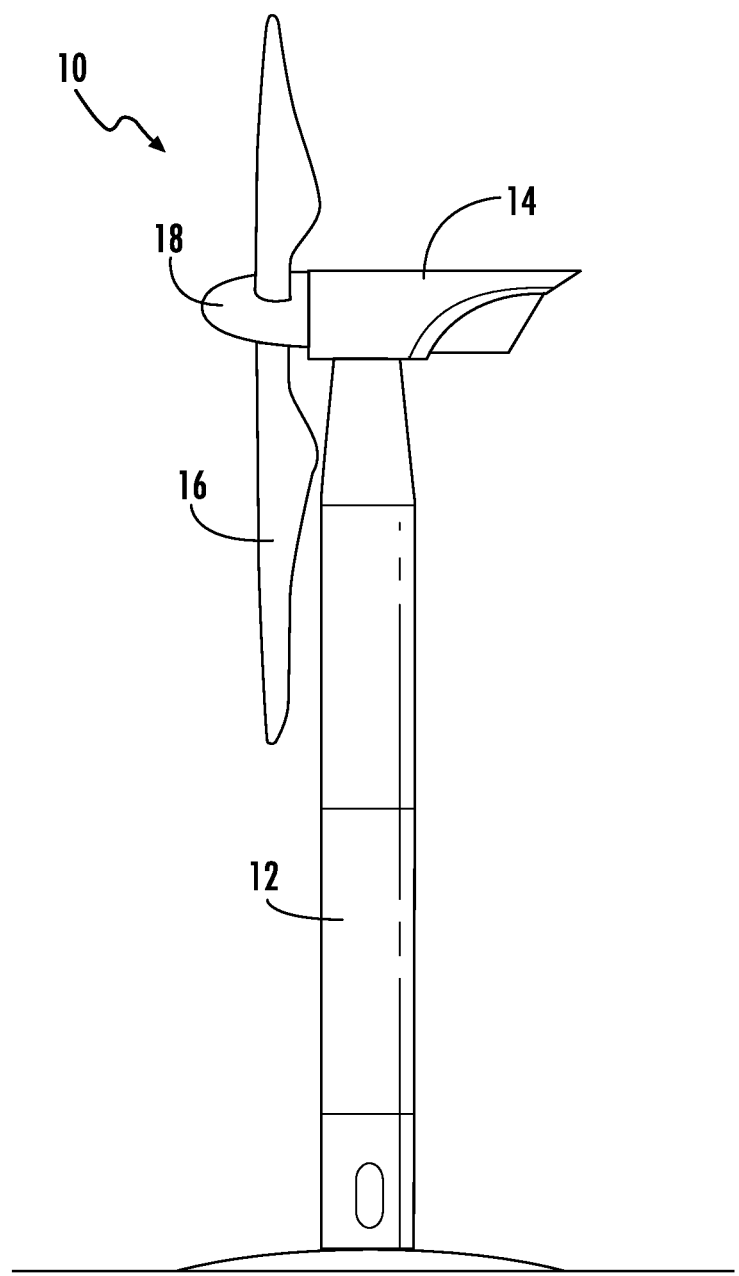
FIG. 1 is a side view of a wind turbine according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
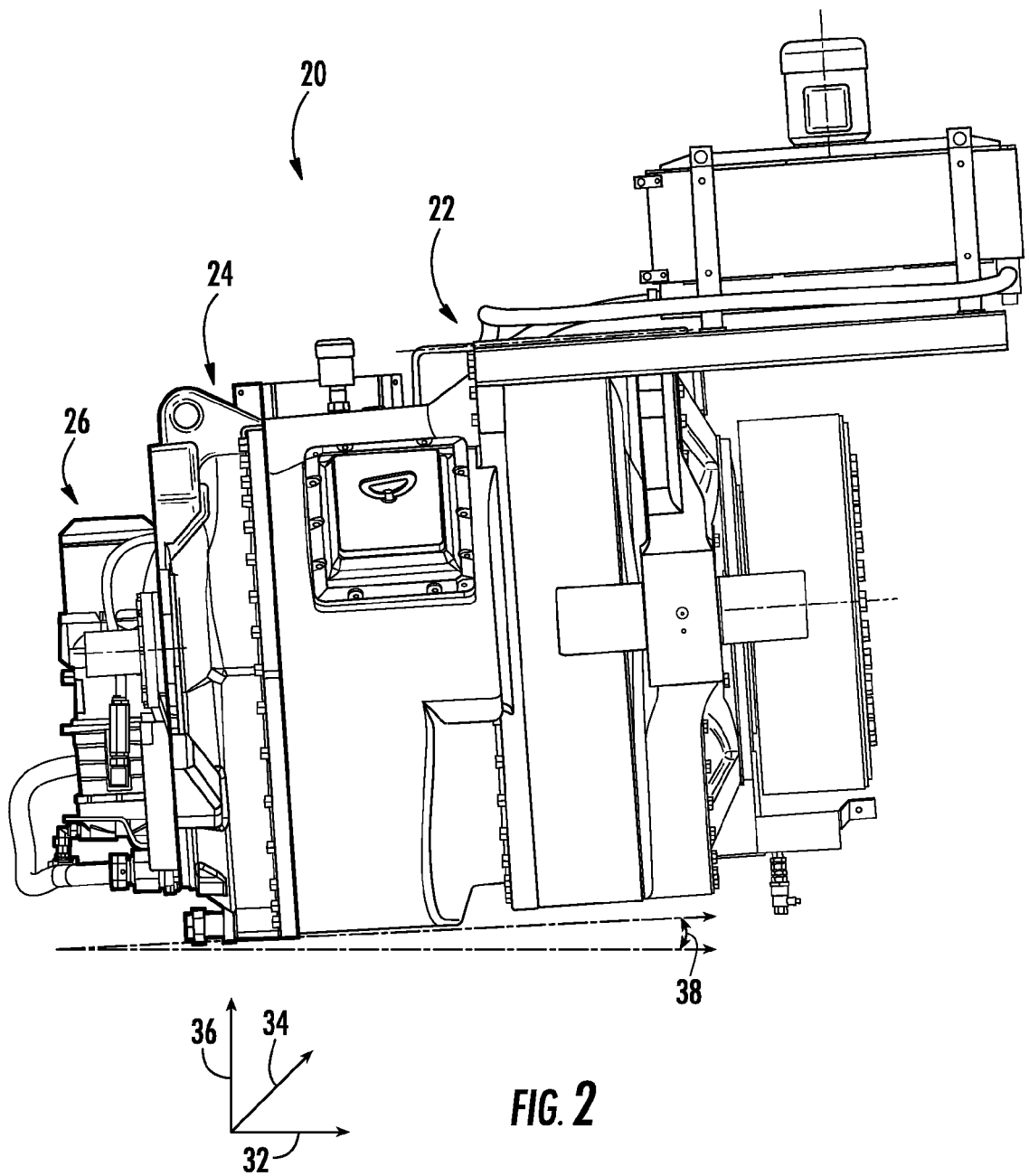
FIG. 2 is a side view of a gearbox for wind turbine according to one embodiment of the present disclosure.
Figure 3:
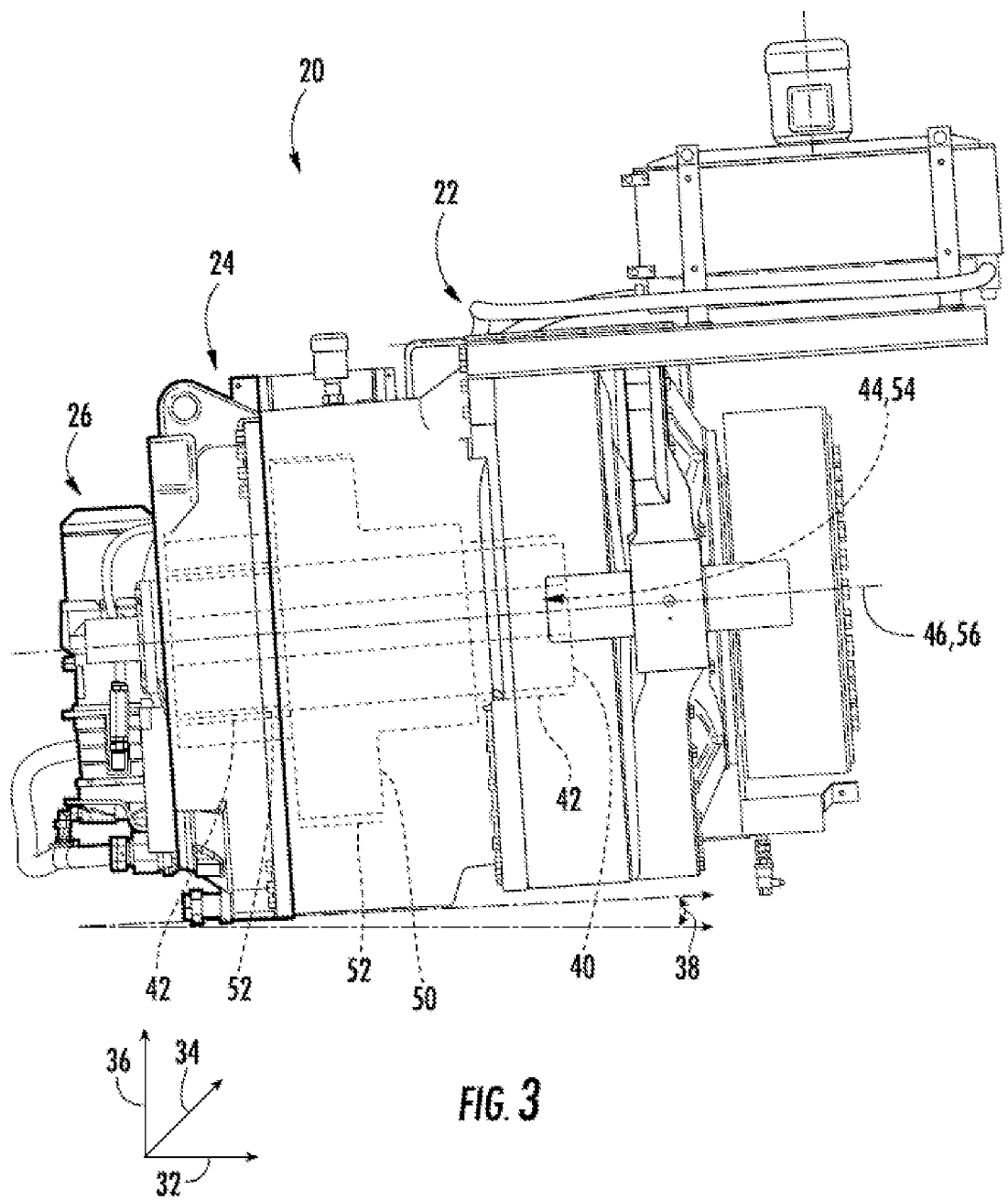
FIG. 3 is a side view of a gearbox for a wind turbine, illustrating various internal components of the gearbox, according to one embodiment of the present disclosure.
Figure 4:
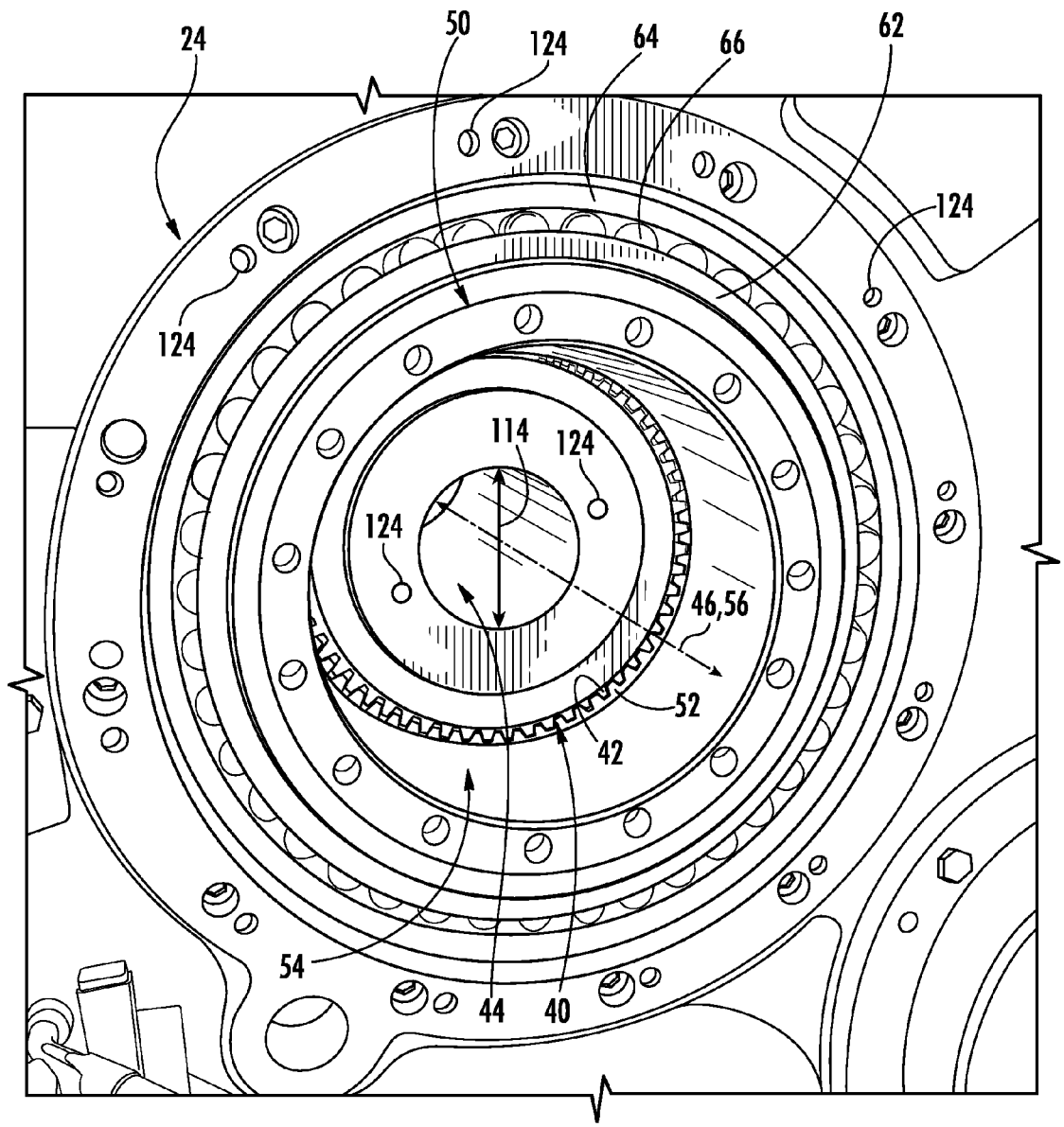
FIG. 4 is a front perspective cutaway view of a gearbox for a wind turbine according to one embodiment of the present disclosure.

FIGS. 2 through 4 illustrate various embodiments of a gearbox 20 according to the present disclosure. The gearbox 20 is included in a wind turbine 10, such as the wind turbine 10 as shown in FIG. 1, and is typically disposed in, for example, the nacelle 14. A gearbox according to the present disclosure includes, for example, a casing. The casing is generally the outer container of the gearbox 20 that houses various internal components. A casing may include, for example, a main casing portion 22, a removable tail portion 24, and an access portion 26. The access portion 26 may be removable to provide access to various of the gears in the gearbox 20, as discussed below. The removable tail portion 24 may additionally be removable from the main casing portion 22, as discussed below.

The gearbox 20 may be positioned relative to a horizontal plane. The horizontal plane may be defined by an X-axis 32 and a Y-axis 34, and may thus be perpendicular to a Z-axis 36, as shown. The gearbox 20, and the various components thereof as discussed below, may be positioned generally parallel to the horizontal plane, or may be positioned at an angle 38 to the horizontal plane. The angle may be in some embodiments between approximately 0.5 degrees and approximately 10 degrees, in some embodiments between approximately 3 degrees and approximately 7 degrees, in some embodiments between approximately 4 degree and approximately 6 degrees, in some embodiments approximately 4 degrees, or in some embodiments approximately 6 degrees. It should be understood that the present disclosure is not limited to the above disclosed angles, and rather that any suitable angle or range thereof relative to the horizontal plane is within the scope and spirit of the present disclosure.

A gearbox 20 according to the present disclosure may include a variety of gears therein. In particular, a gearbox 20 according to the present disclosure includes a sun pinion 40 and a bull gear 50. The bull gear 50 may generally surround the sun pinion 40, such as generally circumferentially as shown in FIGS. 2 and 3. The sun pinion 40 may include external teeth 42 that mesh with internal teeth 52 of the bull gear 50, such that rotation of the sun pinion 40 or the bull gear 50 causes the other to rotate. The sun pinion 40 may define a central aperture 44 therethrough, and may have a central axis 46 along which the sun pinion 40 extends in a generally longitudinal direction. The bull gear 50 may similarly define a central aperture 54 therethrough, and may have a central axis 56 along which the bull gear 50 extends in a generally longitudinal direction. As shown, at least a portion (longitudinally as shown in FIG. 3) of the sun pinion 40 may be disposed within the central aperture 54 of the bull gear 50, such that the sun pinion 40 is surrounded by the bull gear 50. As further shown, the sun pinion 40 and bull gear 50 may extend longitudinally in generally identical longitudinal directions, such that the central axes 46, 56 are generally identical.

The bull gear 50 may further be coupled to the casing, such as to a suitable portion thereof. In exemplary embodiments, for example, the bull gear 50 may be coupled to the tail portion 24 of the casing. Alternatively, however, the bull gear 50 may be coupled to any suitable portion of the casing. As further shown in FIG. 4, at least a portion of the bull gear 50 may be surrounded by a bearing assembly. The bearing assembly may couple the bull gear 50 to the portion of the casing, and may allow the bull gear 50 to rotate with respect to this portion of the casing. In some embodiments as shown, for example, the bearing assembly may include an inner race 62, an outer race 64, and a plurality of bearing elements 66, such as ball bearings, etc., therebetween. The inner race 62 may be coupled to and/or be an outer surface of the bull gear 50, and the outer race 64 may be coupled to and/or be an inner surface of the portion of the casing to which the bull gear 50 is coupled. The bearing elements 66 may allow the inner race 62 to rotate relative to the outer race 64, thus allowing the bull gear 50 to rotate.

As discussed, the gearbox 20 in general may have any suitable position relative to a horizontal plane. The sun pinion 40 and bull gear 50 therein may thus similarly have any suitable position relative to this horizontal plane. Thus, the central axes 46 and 56 may in some embodiments be generally parallel to the horizontal plane, and in other embodiments be disposed at an angle 38 to the horizontal plane.

As discussed, apparatus and methods for maintaining a gearbox 20 are desired. In particular, apparatus and methods for removing and replacing the sun pinion 40 and the bull gear 50, as well as the portion of the casing coupled to the bull gear 50, in safe and efficient manners are desired. Thus, the present disclosure is further directed to a maintenance assembly 100 for maintaining a wind turbine 10 gearbox 20. The maintenance assembly 100 advantageously includes a fixture 102 and a crane 104. The fixture 102 may be attachable to the sun pinion 40 and the bull gear 50 to facilitate safe and efficient removal of these gears, and the crane 104 may move the fixture 102 and, when attached, the gears, to remove and/or replace the gears in a safe and efficient manner. In particular, the fixture 100 allows for the sun pinion 40, bull gear 50, and portion of the casing coupled to the bull gear 50 to be moved for removal and replacement along the central axes 46, 56 thereof, thus, reducing the risk of damage to the gears 40, 50 during movement thereof.

FIGS. 5 through 11 illustrate various embodiments of a fixture 102 according to the present disclosure. The fixture 102 generally includes a frame member 110 and a shaft 112 extending from the frame member 110. Typically, the shaft 112 extends generally perpendicularly to at least a portion of the frame member 110, as discussed below. The shaft 112 is insertable through the central aperture 44 of the sun pinion 40, as well as through the central aperture 54 of the bull gear 50. Thus, as discussed below, the shaft 112 and various portions thereof have diameters that are approximately equal to or less than the diameter 114 of the central aperture 44.

The fixture 102 further may include various attachment mechanisms. For example, the fixture 102 may include one or more first attachment mechanisms 116 attachable to the sun pinion 40, and/or one or more second attachment mechanisms 118 attachable to the bull gear 50. The attachment mechanisms 116, 118, when attached to the respective gears 40, 50, attach the gears 40, 50 to the fixture 102 for movement with the fixture 102. Thus, after attachment thereto, movement of the fixture 102 moves the gears 40, 50. In particular, as discussed below, the fixture 102 moves the gears 40, 50 along the central axis 46, 56.

In exemplary embodiments, as shown, an attachment mechanism includes a threaded rod 120 and a threaded bore hole 122 defined in the fixture 102. The sun pinion 40 and/or bore gear 50 may similarly include a threaded bore hole 124 defined in a face thereof. With respect to the bore gear 50, the threaded bore hole 124 may for example be defined in a face of the outer race 64 as shown or other suitable component of the bore gear 50. The rod 120 may be threadably inserted into the bore holes 122, 124 to couple the sun pinion 40 and/or bore gear 50 to the fixture 102. In exemplary embodiments, as shown, the bore hole 122 defined in the fixture 102 may be defined in a flange 126 of the fixture 102, such that the attachment mechanism attaches the gear 40, 50 to the flange 126. The flange 126 may be disposed, for example, between the shaft 112 and the frame member 110 as shown, or have another suitable location.

In other embodiments, an attachment mechanism may include any suitable components for attaching the fixture 102 to the sun pinion 40 and/or bull gear 50. For example, an attachment mechanism may include suitable male members or female members for mating with respective female members or male members of the gear 40, 50. Additionally or alternatively, an attachment mechanism may include clamps, brackets, magnets, or other suitable components for attaching a gear 40, 50 to the fixture 102 such that movement of the fixture 102 moves the gear 40, 50.

Figure 5:
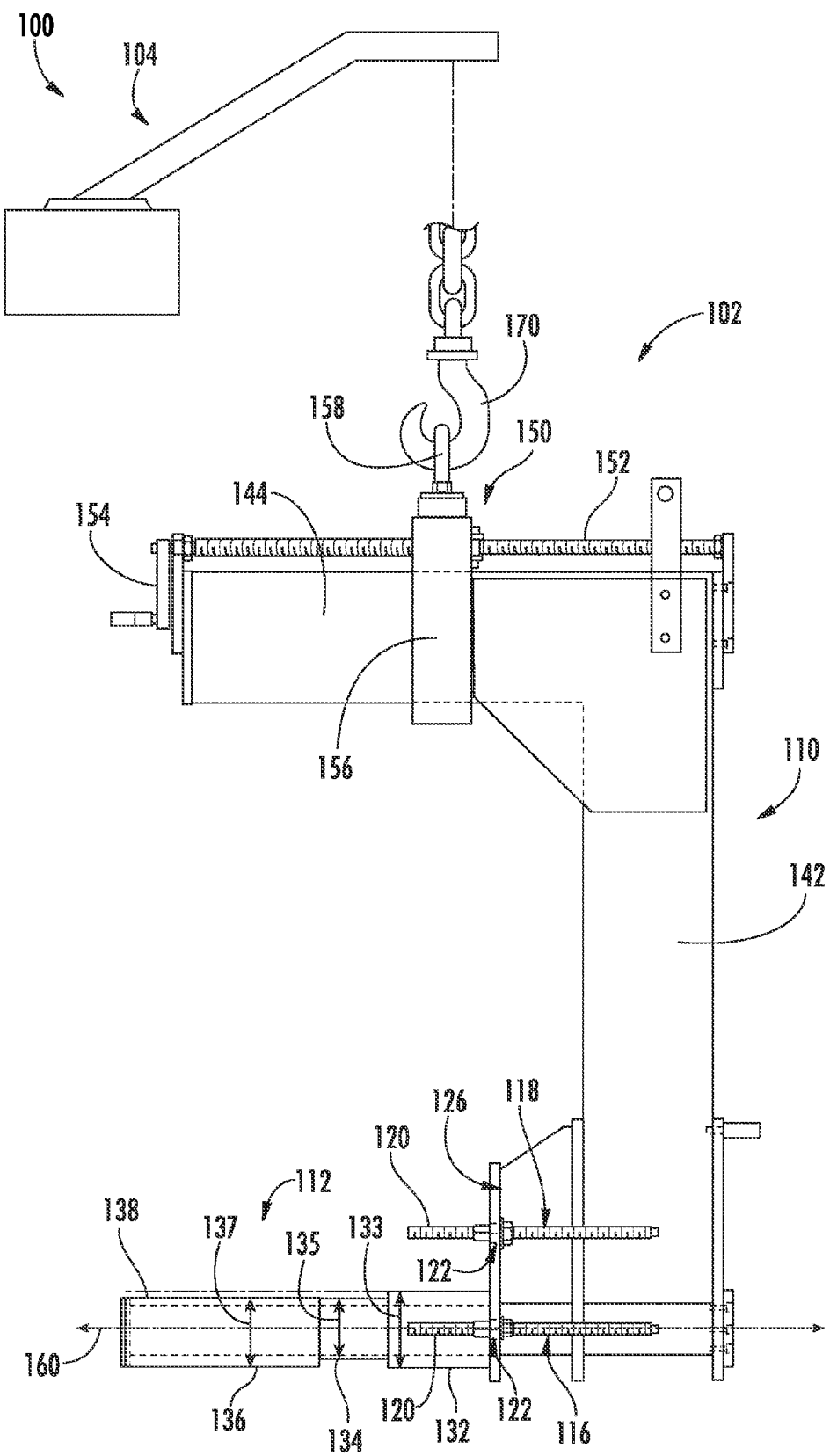
FIG. 5 is a side view of a fixture for maintaining a wind turbine gearbox, including an adjustment device in a first position, according to one embodiment of the present disclosure.

As discussed, the shaft 112 of the fixture 102 may be inserted through the central aperture 44, 54 of the sun pinion 40 or bull gear 50. Attachment mechanisms may then be removably attached to the sun pinion 40 or bull gear 50 to facilitate movement of this gear. In exemplary embodiments, the shaft 112 further includes various portions that support the sun pinion 40 and bull gear 50 during such movement while preventing damage to these gears. As shown in FIG. 5, for example, the shaft 112 may include a first shaft portion 132, a second shaft portion 134, and a third shaft portion 136. The first shaft portion 132 may be disposed proximate the frame member 110 relative to the second and third shaft members 134, 136, such that the first shaft portion 132 is thus closest to the frame member 110. The second shaft portion 134 may be disposed between the first and third shaft portions 132, 136, and the third shaft portion 136 may thus be the farthest from the frame member 110. In exemplary embodiments, the first shaft member 132 may have a diameter 133 that is approximately equal to the diameter 114 of the sun pinion 40 central aperture 44. Thus, when the shaft 112 is inserted into the central aperture 44, the shaft 112 and central aperture 44 may have a generally snug fit such that the sun pinion 40 is supported by the shaft 112. In other embodiments, however, the diameter 133 may be less than the diameter 114.

Further, the second shaft portion 134 may have a diameter 135 that is less than the diameter of the central aperture 44, and in some embodiments less than the diameter 133 of the first shaft portion 132. As discussed, the shaft 112 may be insertable into the central aperture 54 of the bull gear 50. The relatively smaller diameter 135 of the second shaft portion 134 may allow this portion of the shaft 112 to clear and support the teeth 52 of the bull gear 50 when the shaft 112 is brought into contact with the bull gear 50 in the central aperture 44 thereof.

Figure 6:
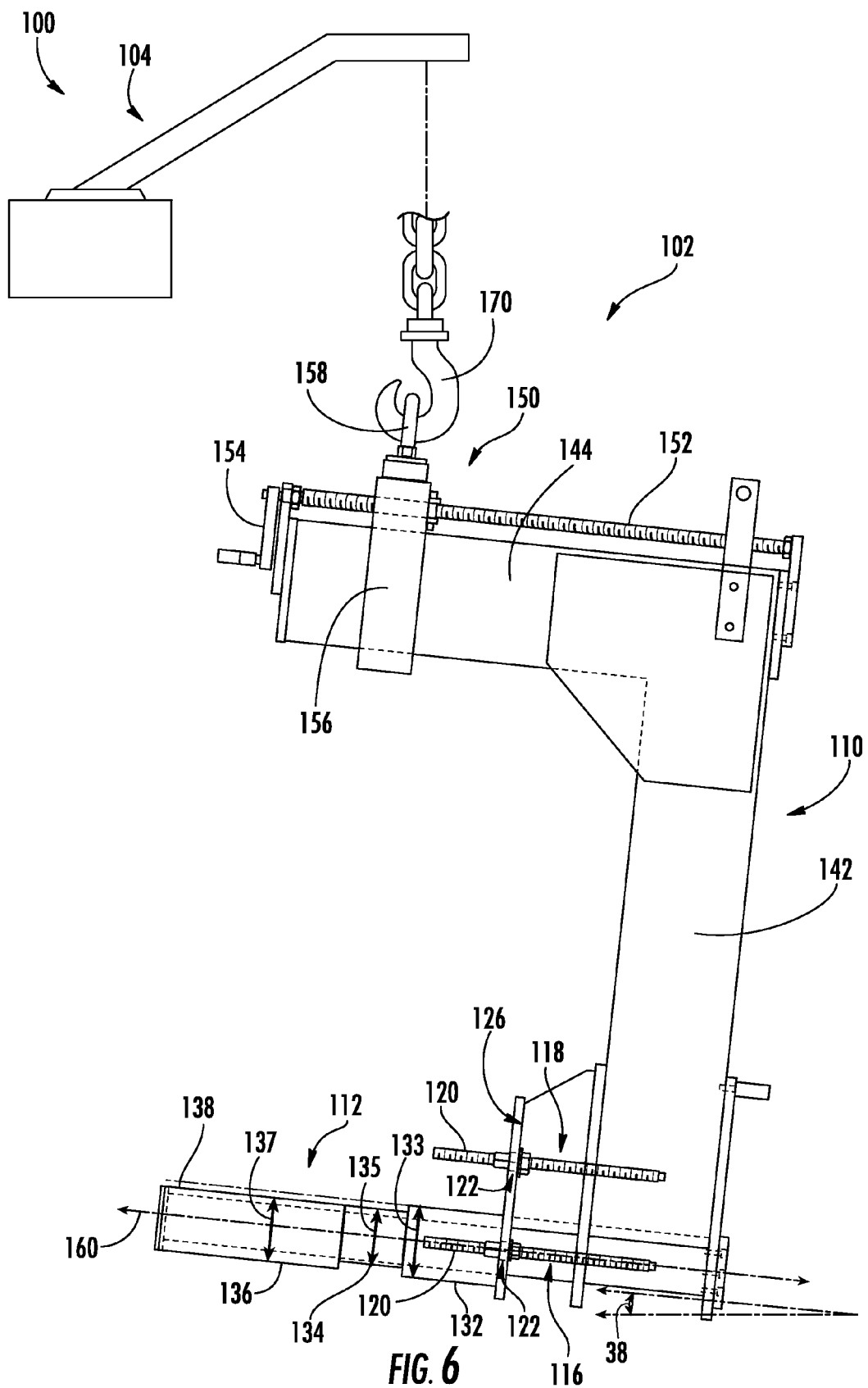
FIG. 6 is a side view of a fixture for maintaining a wind turbine gearbox, including an adjustment device in a second position, according to one embodiment of the present disclosure.
Figure 7:
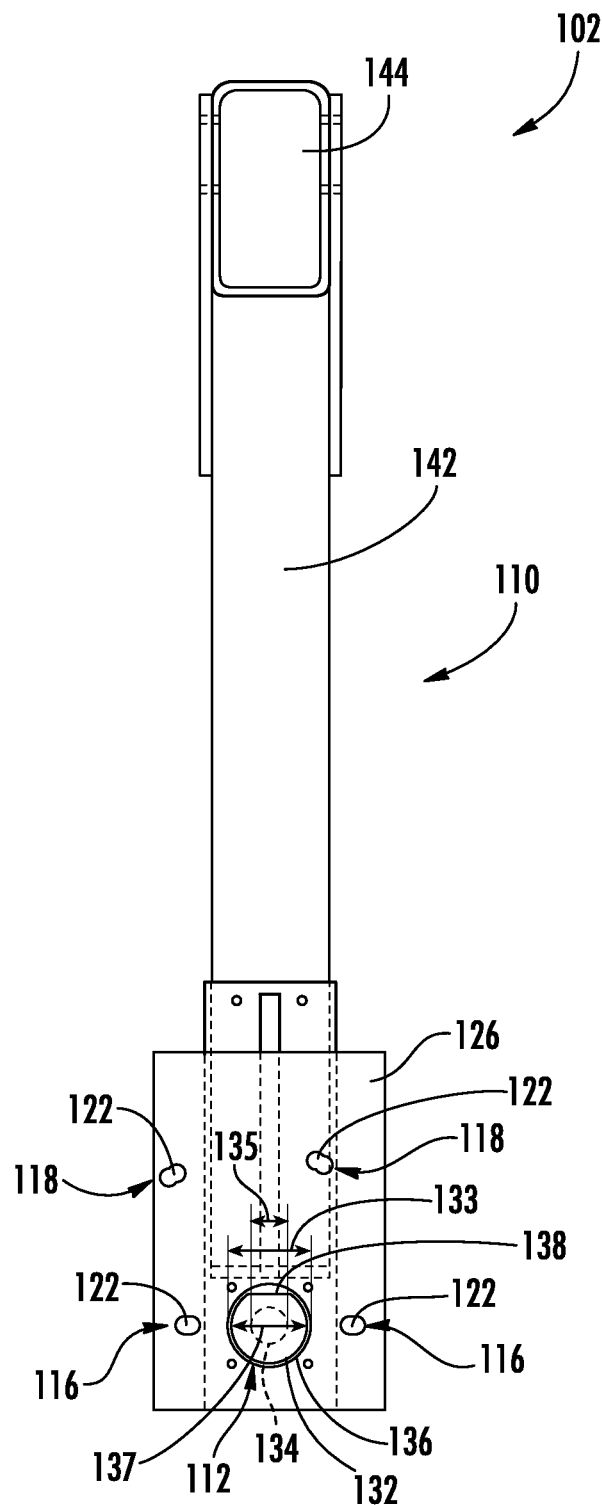
FIG. 7 is a front view of a fixture for maintaining a wind turbine gearbox according to one embodiment of the present disclosure.
Figure 8:
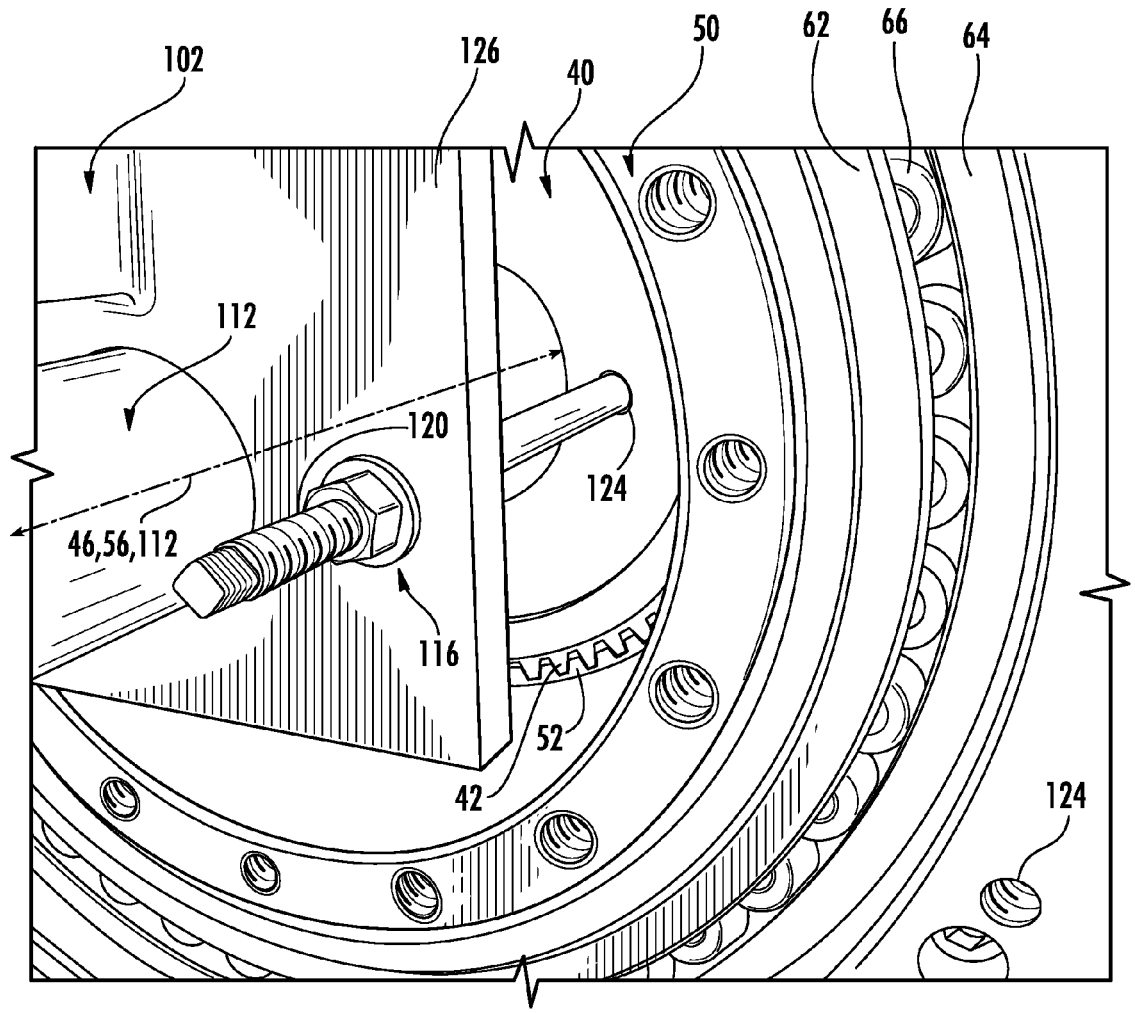
FIG. 8 is a perspective view of a portion of a fixture and a wind turbine gearbox, wherein the fixture is attached to a sun pinion, according to one embodiment of the present disclosure.
Figure 9:
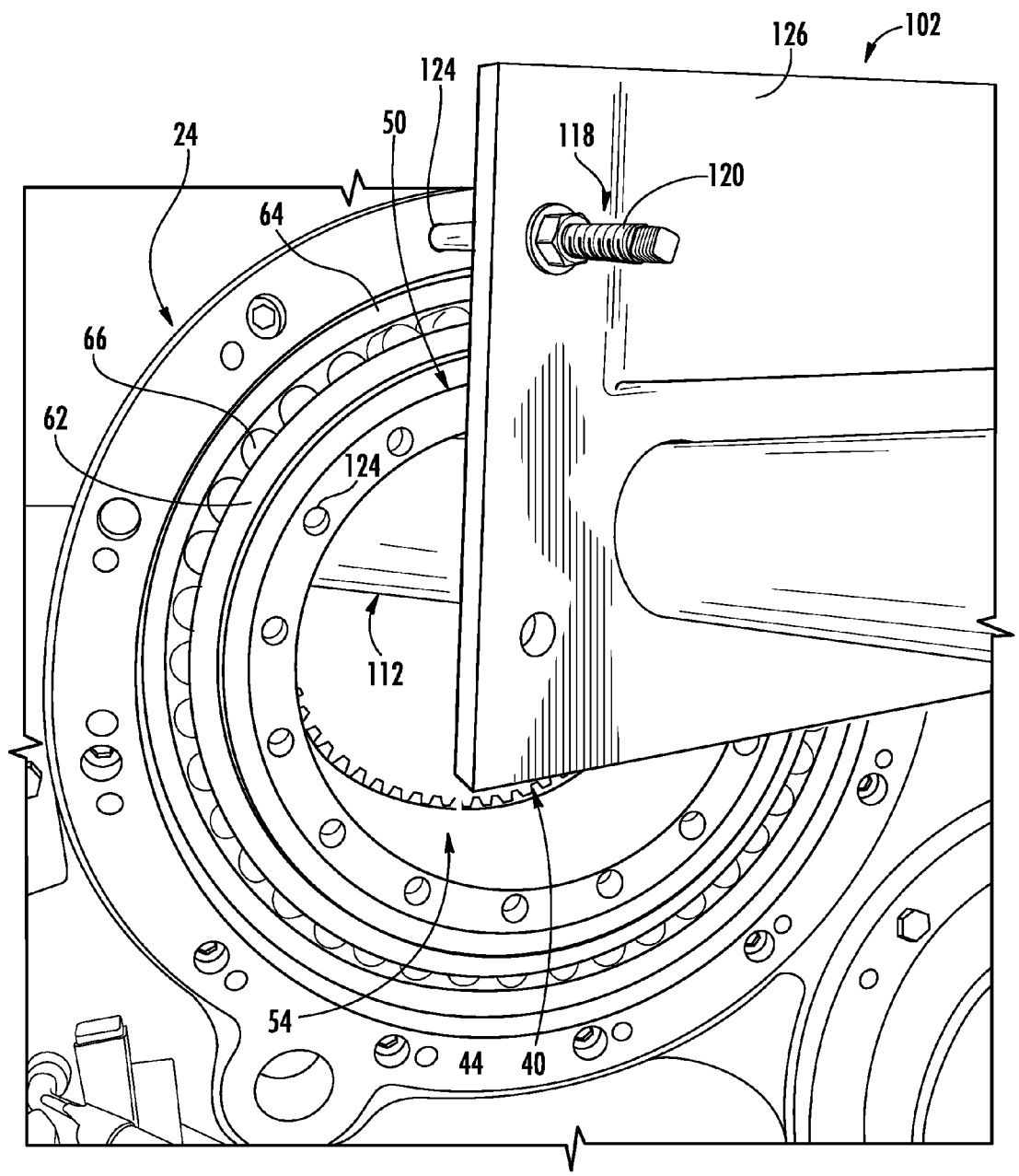
FIG. 9 is a perspective view of a portion of a fixture and a wind turbine gearbox, wherein the fixture is attached to a bull gear and a removable tail portion of a casing, according to one embodiment of the present disclosure.
Figure 10:
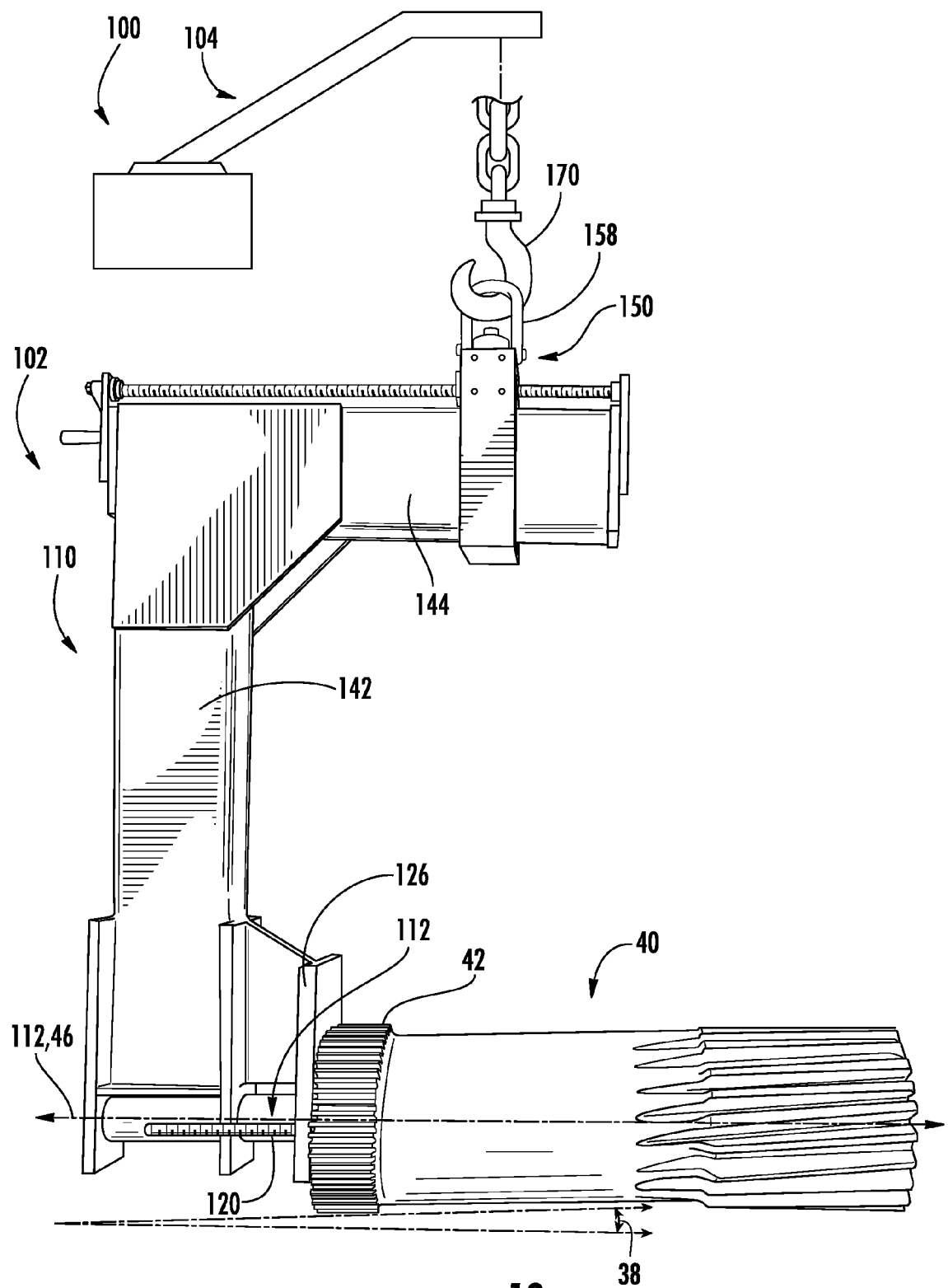
FIG. 10 illustrates a maintenance assembly with a sun pinion attached thereto and removed from a gearbox according to one embodiment of the present disclosure.
Figure 11:
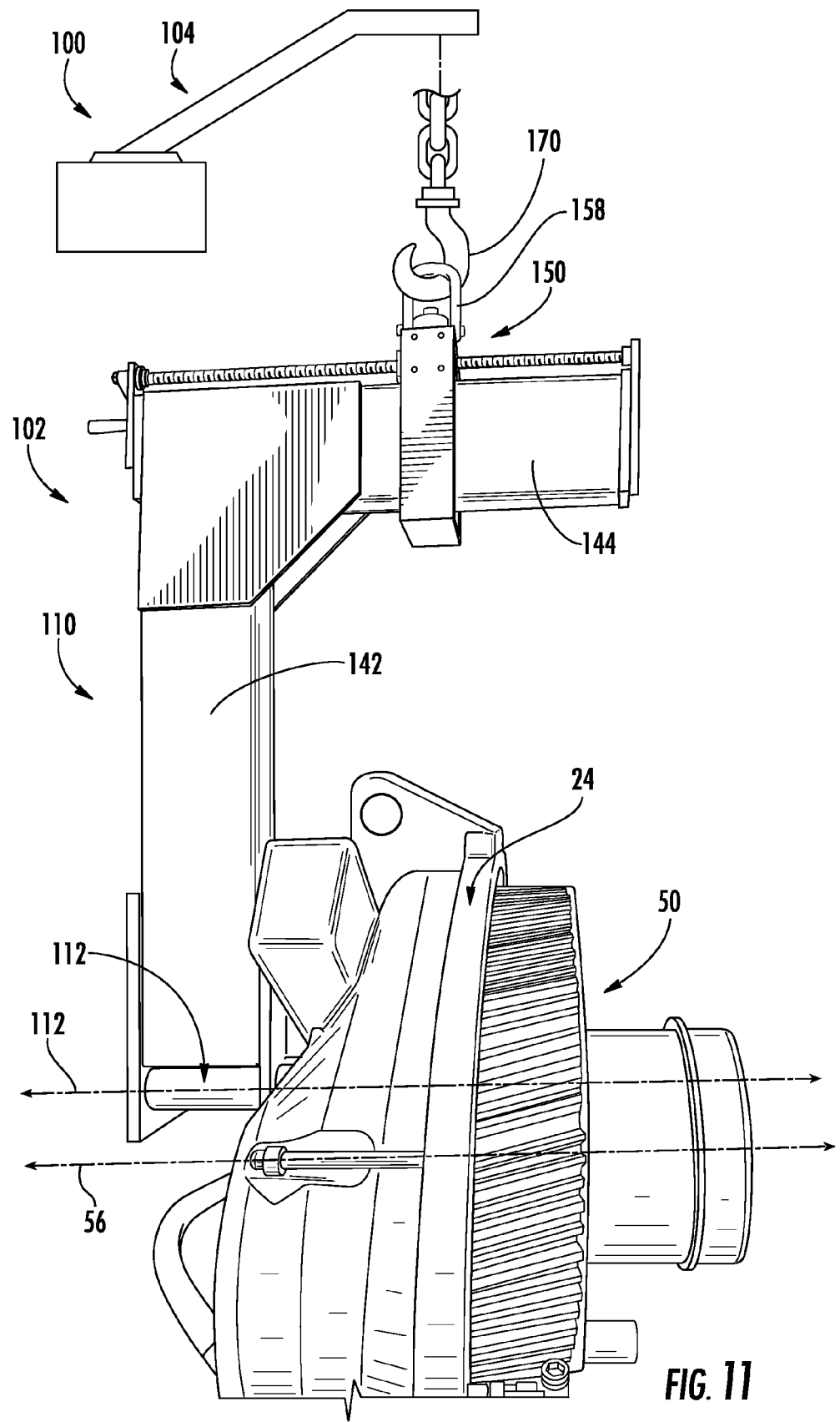
FIG. 11 illustrates a maintenance assembly with a bull gear and a portion of a casing attached thereto and removed from a gearbox according to one embodiment of the present disclosure.

Further, the third shaft portion 136 may have a diameter 137 that is approximately equal to the diameter 133 of the first shaft portion 133. This allows the third shaft portion 136 to generally support the sun pinion 40. The third shaft portion 136 may additionally, however, be generally frusto-cylindrical, thus having a generally flat surface portion 138. The generally flat surface portion 138 may be an upper portion of the third shaft portion, as shown in FIGS. 5 through 7. Similarly to the second shaft portion 134, the frusto-cylindrical shape of the third shaft portion 136 may allow this portion of the shaft 112 to clear and support the teeth 52 of the bull gear 50 when the shaft 112 is brought into contact with the bull gear 50 in the central aperture 44 thereof.

It should be understood that in alternative embodiments, the second shaft portion 134 and third portion 136 may have any suitable shapes and diameters as desired or required for a particular application.

After insertion of the shaft 112 of the fixture 102 through the central aperture 44, 54 of the sun pinion 40 or bull gear 50 and attachment of attachment mechanisms to the sun pinion 40 or bull gear 50, the fixture 102 and attached sun pinion 40 or bull gear 50 and portion of the casing coupled to the bull gear 50 may be moved. Upon attachment of the attachment mechanisms, such as the first attachment mechanisms 116 to the sun pinion 40 or the second attachment mechanisms 118 to the bull gear 50, the fixture may thus be configured for moving the sun pinion 40 and/or bull gear 50 along the central axes 46, 56 thereof. As such, the fixture 102, and in particular the shaft 112 thereof, may be oriented relative to the axes 46, 56 to facilitate movement along the central axes 46, 56.

In some embodiments, for example, the frame member 110 may include a first frame section 142 and a second frame section 144, and may be generally L-shaped. The first frame section 142 and the second frame section 144 may thus be generally perpendicular to one another. The shaft 112 may extend from the first frame section 142, and thus be generally perpendicular to the first frame section 142 and parallel to the second frame section 144. The second frame section 144 may balance the fixture 102 generally and relative to the shaft 112, particularly when a gear 40, 50 is attached to the fixture 102.

In further embodiments, the fixture 102 may include an adjustment mechanism 150. The adjustment mechanism 150 may be configured for adjusting the orientation of the fixture relative to the central axes 40, 50, such as by taking into account the center of gravity of the fixture, both when unloaded and loaded with a gear. The adjustment mechanism 150 may for example be mounted to the frame member 110, such as in exemplary embodiments to the second frame section 144 thereof. The adjustment mechanism 150 may further be movable along the second frame section 144 to adjust the orientation of the fixture 102. For example, as shown in FIGS. 5, 6, 9 and 10, the adjustment mechanism 150 may include a threaded rod 152 which is fixed and generally rotatable based on, for example, rotation of a handle 154. A bracket 156 may surround the second frame section 144 may be movably coupled to the threaded rod 152, such that rotation of the rod 152 causes generally linear movement of the bracket 156 along the second frame section 144. A hoist ring 158 may be attached to the bracket 156. The hoist ring 158 may serve as a connection point for connecting the fixture 102 to the crane 104. Movement of the bracket 156, and thus the hoist ring 158 may thus alter the orientation of the fixture 102, and specifically alter the orientation of the shaft 112. For example, when the bracket 156 is in a designated position, the fixture 102, such as a central axis 160 of the shaft 112 thereof, may be generally parallel to the horizontal plane. When the bracket 156 is moved towards the first frame section 142 from this position, the fixture and central axis 160 may be angled relative to the horizontal plane in one direction, and when the bracket 156 is moved away from the first frame section 142 from this position, the fixture and central axis 160 may be angled relative to the horizontal plane in an opposite direction. It should be understood, however, that the present disclosure is not limited to the above described adjustment mechanism 150, and rather that any suitable mechanism for adjusting the orientation of the fixture 102 is within the scope and spirit of the present disclosure.

Thus, before inserting the shaft 112 into the central aperture 44 or 54, the adjustment mechanism 150 may be adjusted such that the fixture 102, and thus the central axis 160 of the shaft 112, is generally parallel to the central axis 46, 56 of the gear 40, 50. This allows the shaft 112 to be inserted without damage to the gear 40, 50. Further, after attachment of the fixture 102 to the gear 40, 50, and if necessary during movement of the fixture 102 and attached gear 40, 50 (and portion of the casing coupled to the bull gear 50) along the respective axis 46, 56, the adjustment mechanism 150 may further be adjusted to account for the change in the center of gravity of the fixture 102 due to the addition of the attached gear 40, 50, to thus allow the fixture 102 and central axis 160 thereof to maintain this orientation. This allows the gear 40, 50 to be removed from or replaced in the gearbox 20 safely and efficiently. For example, to facilitate such removal or replacement, the adjustment of the fixture 102 and central axis 160 may in some embodiments be to angle 38, to facilitate movement into or out of the gearbox 20. This adjustment can occur for removal purposes before, during, and/or after attachment of the fixture 102 to the gear 40, 50, which in these embodiments is already in the gearbox 20 and at the angle 38. For replacement purposes, this adjustment can occur before, during, and/or after attachment of the fixture 102 to the gear 40, 50, which in these embodiments may or may not already be at the angle 38. Adjustment to this angle 38 may be made, for example, after attachment to the fixture 102 to facilitate insertion of the gear 40, 50 into the gearbox 20 for replacement thereof.

As discussed, a maintenance assembly 100 according to the present disclosure includes a fixture 102, and further includes a crane 104. The crane 104 may be configured to move the fixture 102, such that for example the fixture 102 and associated gear 40, 50 move along the various axes 46, 56 thereof. The fixture 102 may be connected to the crane 104 for example at the hoist ring 158, which may be included on any suitable adjustment mechanism 150 or separate from an adjustment mechanism 150 on the fixture 102. Any suitable crane 104 may be utilized in a maintenance assembly 100 according to the present disclosure, including for example an overhead crane, tower crane, telescopic crane, jib crane, etc. A hook 170 of the crane may directly contact the fixture 102, such as the hoist ring 158, to connect the fixture 102 with the crane 104, or a strap, chain, etc., may extend between the hook 170 and fixture 102 to provide the connection, or the fixture 102 may be otherwise suitable connected to the crane 104. The crane 104 may move the fixture 102 as desired or required, and as discussed above. The fixture 102, including the various components and orientation thereof, may provide for safe and efficient movement of the sun pinion 40 and the bull gear 50 and portion of the casing coupled to the bull gear 50, thus allowing for removal and/or replacement thereof onsite in a wind tower 10, such as in the nacelle 14 thereof.

The present disclosure is further directed to methods for maintaining a wind turbine 10 gearbox 20. A method may include, for example, inserting a shaft 112 through a central aperture 44 of a sun pinion 40, attaching the sun pinion 40 to a frame member 110, and moving the sun pinion 40 along a central axis 46 of the sun pinion 40, as discussed above. The method may additionally or alternatively include, for example, inserting a shaft 112 through a central aperture 54 of a bull gear 50, attaching the bull gear 50 to a frame member 110, and moving the bull gear 50 and portion of the casing coupled to the bull gear 50 along a central axis 56 of the bull gear 50, as discussed above. If the gears are being removed, in some embodiments attachment and movement of the sun pinion 40 may occur before attachment and movement of the bull gear 50. If the gears are being replaced, in some embodiments attachment and movement of the bull gear 50 may occur before attachment and movement of the sun pinion 40.

A method may further include, for example, adjusting an orientation of the central axis 160 of the shaft 112 to generally parallel with the central axis 46 of the sun pinion 40 and/or the central axis 56 of the bull gear 50, as discussed above. A method may further include adjusting an orientation of the central axis 160 of the shaft 112 fixture relative to a center of gravity after attaching the sun pinion 40 or bull gear 50 to the frame member 110, as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fixture for maintaining a wind turbine gearbox, the gearbox comprising a sun pinion and a bull gear surrounding the sun pinion, the sun pinion and the bull gear each defining a central aperture therethrough and having a central axis, the gearbox further comprising a casing, at least a portion of the casing coupled to the bull gear, the fixture comprising:
- a frame member;
- a shaft extending from the frame member, the shaft insertable through the central aperature of the sun pinion; and
- an attachment mechanism removably attachable to the sun pinion,
- wherein upon attachment of the attachment mechanism to the sun pinion, the fixture is configured for moving the sun pinion along the central axis of the sun pinion.

2. The fixture of claim 1, wherein the attachment mechanism removably attaches the sun pinion to a flange of the frame member.

3. The fixture of claim 1, wherein the attachment mechanism includes a threaded rod.

4. The fixture of claim 1, further comprising a second attachment mechanism removably attachable to the bull gear, and wherein upon attachment of the second attachment mechanism to the bull gear, the fixture is configured for adjustment of the bull gear and the portion of the casing coupled to the bull gear along the central axis of the bull gear.

5. The fixture of claim 1, wherein the central axis of the sun pinion and the central axis of the bull gear are disposed at an angle to a horizontal plane, the angle in the range between approximately 0.5 degrees and approximately 10 degrees.

6. The fixture of claim 5, wherein the angle is in the range between approximately 3 degrees and approximately 7 degrees.

7. The fixture of claim 1, wherein the frame member is generally L-shaped and comprises a first frame section generally perpendicular to the shaft and a second frame section generally perpendicular to the first frame section.

8. The fixture of claim 1, further comprising an adjustment mechanism configured for adjusting an orientation of the fixture relative to the central axis of the sun pinion.

9. The fixture of claim 8, wherein the frame member is generally L-shaped and comprises a first frame section generally perpendicular to the shaft and a second frame section generally perpendicular to the first frame section, and wherein the adjustment mechanism is movable along the second frame section.

10. The fixture of claim 1, wherein the shaft comprises a first shaft portion, a second shaft portion, and a third shaft portion, the first shaft portion disposed proximate the frame member relative to the second shaft portion and the third shaft portion, the second shaft portion disposed between the first shaft portion and the third shaft portion, the first shaft portion having a diameter approximately equal to a diameter of the central aperture of the sun pinion, the second shaft portion having a diameter less than the diameter of the central aperture of the sun pinion.

11. The fixture of claim 10, wherein the third shaft portion has a diameter approximately equal to a diameter of the central aperture of the sun pinion and is frusto-cylindrical.

12. A maintenance assembly for a wind turbine gearbox, gearbox comprising a sun pinion and a bull gear surrounding the sun pinion, the sun pinion and the bull gear each defining a central aperture therethrough and having a central axis, the gearbox further comprising a casing, at least a portion of the casing coupled to the bull gear, the maintenance assembly comprising; a fixture, the fixture comprising:
- a frame member;
- a shaft extending from the frame member, the shaft insertable through the central aperture of the sun pinion;
- an attachment mechanism removably attachable to the sun pinion; and
- a hoist ring; and
- a crane configured to move the fixture, the fixture connected to the crane at the hoist ring,
- wherein upon attachment of the attachment mechanism to the sun pinion, the fixture and sun pinion are configured for movement by the crane along the central axis of the sun pinion.

13. The maintenance assembly of claim 12, further comprising a secondary attachment mechanism removably attachable to the bull gear, and wherein upon attachment of the secondary attachment mechanism to the bull gear, the fixture, the bull gear, and the portion of the casing coupled to the bull gear are configured for movement by the crane along the central axis of the bull gear.

14. The maintenance assembly of claim 12, further comprising an adjustment mechanism configured for adjusting an orientation of the fixture relative to the central axis of the sun pinion.

15. The maintenance assembly of claim 14, wherein the hoist ring is coupled to the adjustment mechanism.

* * * * *